United States Patent
Puzic et al.

(10) Patent No.: US 6,414,056 B1
(45) Date of Patent: Jul. 2, 2002

(54) ASPHALT COMPOSITIONS AND METHOD FOR MAKING (LAW617)

(75) Inventors: Olga Puzic; Kenneth Edward Williamson, both of Sarnia (CA)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/074,709

(22) Filed: May 8, 1998

(51) Int. Cl.[7] ................................................. C08K 5/07
(52) U.S. Cl. .............................. 524/59; 524/68; 524/69; 524/70; 524/71
(58) Field of Search .............................. 524/59, 68, 69, 524/70, 71

(56) References Cited

U.S. PATENT DOCUMENTS

| | | | |
|---|---|---|---|
| 3,751,278 A | 8/1973 | Alexander | 106/273 R |
| 4,301,051 A | 11/1981 | Marzocchi et al. | 524/461 |
| 4,440,886 A | 4/1984 | Kraus | 524/68 |
| 4,460,723 A | 7/1984 | Rollmann | 524/70 |
| 4,882,373 A | 11/1989 | Moran | 524/68 |
| 5,037,474 A | 8/1991 | Mesch et al. | 106/273.1 |
| 5,059,300 A | 10/1991 | McGinnis | 208/44 |
| 5,070,123 A | 12/1991 | Moran | 524/69 |
| 5,098,480 A | 3/1992 | McGinnis et al. | 106/273.1 |
| 5,306,343 A | 4/1994 | Richardson, III et al. | 106/668 |
| 5,306,750 A | 4/1994 | Goodrich et al. | 524/59 |
| 5,330,569 A | 7/1994 | McGinnis et al. | 106/284.1 |
| 5,348,994 A | 9/1994 | Gorbaty et al. | 524/68 |
| 5,519,073 A | 5/1996 | van der Werff et al. | 524/62 |
| 5,565,510 A | 10/1996 | Giavarini et al. | 524/70 |
| 5,880,185 A * | 3/1999 | Planche et al. | 524/68 |

FOREIGN PATENT DOCUMENTS

| | | |
|---|---|---|
| DE | 225517 | 6/1909 |
| EP | 0710700 | 5/1996 |
| EP | 0792918 | 9/1997 |
| WO | 9743342 | 11/1997 |

* cited by examiner

Primary Examiner—Edward J. Cain
(74) Attorney, Agent, or Firm—Linda M. Scuorzo

(57) ABSTRACT

The present invention relates to novel polymer modified asphalt polyphosphoric and superphosphoric acid treated binder compositions having enhanced high service temperature performance properties and the method of making them and to road paving asphalts containing them.

17 Claims, No Drawings

ASPHALT COMPOSITIONS AND METHOD FOR MAKING (LAW617)

FIELD OF THE INVENTION

The present invention relates to modified asphalt paving binder compositions.

BACKGROUND OF THE INVENTION

Asphalt is a visoelastic semi-solid bituminous material derived from the distillation residue of crude petroleum. Because it has good adhesive and weathering characteristics, it is widely used as a binder or cement for stone or rock aggregate in pavement construction. If, because of the nature of the crude oil distilled, the asphalt is too soft at ambient temperature, a harder product may be manufactured, for example, by extraction of the lighter components with liquid propane or other solvents, or by oxidizing by air blowing at an elevated temperature. However, these manufacturing processes can produce asphalts that are too brittle at low temperature, and result in excessive cracking in cold weather. Another means of stiffening soft asphalt to extend its useful temperature range is by blending with suitable polymers. Polymers can reduce the tendency of an asphalt pavement to creep and rut in warm weather by increasing its high temperature viscoelastic stiffness. Thus, polymers have been added which permit the use of, in some instances, softer grades of asphalt to reduce cracking in cold weather without risking excessive softening in hot weather.

Other components have been added to asphalts and polymer modified asphalts to improve their physical properties such as storage stability and viscoelastic properties. U.S. Pat. No. 5,348,994 teaches the preparation of storage stable pavement binder having improved viscoelastic properties inter alia by cosulfonation followed by neutralization of a blend of asphalt and polymer having some unsaturated bonds. U.S. Pat. No. 5,070,123 discloses a method of improving storage stability by first adding an inorganic acid such as hydrochloric acid, phosphorus pentoxide and preferably, phosphoric acid to an asphalt then adding from about 1.0 to about 15 wt % polymer to the blend. The patent does not teach or suggest the use of superphosphoric or polyphosphoric acid. U.S. Pat. No. 4,882,373 discloses an asphaltic composition having improved tensile properties produced by the process of contacting an asphalt with a mineral acid to form an acid modified asphalt, oxidizing the resulting material to form an acid/oxygen modified asphalt, contacting it with a thermoplastic elastomer and then with specified unsaturated functional monomers. Phosphoric acid is disclosed as one of the mineral acids. U.S. Pat. No. 5,565,510 discloses the addition of polyphosphoric acid to bitumen then blending with that product a polymer containing a propylene homo- or co-polymer, a xylene soluble co-polymer fraction and optionally a xylene insoluble ethylene co-polymer fraction. U.S. Pat. No. 3,751,278 discloses treatment of an asphalt with a phosphoric acid mixture having a $H_3PO_4$ equivalent of greater than 100% concentration and including ortho-, pyro-, and poly-phosphoric acids. However, polymer addition is not taught or suggested. German patent DE 2255173 C3 teaches the use of 85% o-phosphoric acid, i.e., the addition of low molecular weight phosphoric acid. None of the above patents teach or suggest the addition of superphosphoric or polyphosphoric acid to the asphalt which contains polymer enabling a cross-linking between asphalt and polymer moieties.

Thus, there is a continuing need for new compositions having both enhanced low and high temperature service properties that minimizing the amount of costly additional materials such as monomers and polymers and process steps such as air blowing when making polymer modified asphalt binders. Applicants' invention addresses these needs.

SUMMARY OF THE INVENTION

The present invention provides for modified asphalt binder compositions and the method of making the compositions including phosphonated polymer modified asphalt binder composition having enhanced viscoelastic properties, over a wide temperature range, comprising a storage stable blend of:

an admixture of phosphoric acid having an $H_3PO_4$ equivalent of at least 100%; a major amount of an asphalt having a flash point of at least 230° C.; and a minor amount of a polymer selected from polymers having at least one diene monomer or unsaturated bond. Polymer is present in the range of 0.5–7 wt %, preferably 0.5–3 wt % polymer to total composition. The phosphoric acid is admixed in the range of 0.05–2 wt %, preferably not more than 0.7 wt % based on the weight of the total composition. Typically, the starting asphalt has a penetration of 50–600 dmm.

The invention also includes combination of the novel binder compositions with aggregate.

The present invention may suitably comprise, consist or consist essentially of the elements disclosed herein and includes the products produced by the processes disclosed herein.

DETAILED DESCRIPTION OF THE INVENTION

This invention provides for novel polymer modified asphalt binder and paving compositions, and their methods of preparation and use. The compositions possess enhanced viscoelastic properties at both low and high temperatures. Desirably, these performance characteristics can be achieved at lower amounts of added polymer (typically 30–70% less) than are currently used for a given grade of polymer modified asphalt.

It has been discovered that storage stable polymer modified asphalt binders having low temperature performance (equivalent to base/unmodified asphalt) and having enhanced rutting resistance can be produced by combining a blend of asphalt and polymer with a phosphonating agent having $H_3PO_4$ equivalent concentration of greater than 100%, such as superphosphoric acid (i.e., having $H_3PO_4$ equivalent concentration of 105%) and polyphosphoric acid (i.e., having $H_3PO_4$ equivalent concentration of 115–117%). Typically the foregoing acids will have a viscosity at 100° C. of from 36 to 1,010 cP. An amount of 0.05–2 wt %, preferably 0.05–0.7 wt %, of the phosphonating agent is added to the asphalt and polymer mixture.

Superphosphoric acid is represented by a formula of $H_{3.3}P_{1.3}O_5$ and a molecular weight of approximately 125 and polyphosphoric acid is represented by a molecular formula of approximately $H_{5.5}P_{3.5}O_{11.5}$ and a molecular weight of approximately 296. Typically grades include 105% for superphosphoric acid (designated herein as SP 105), and 115% and 117% (designated herein as PP 115 and PP 117) for polyphosphoric acid.

Superphosphoric acid having a $H_3PO_4$ equivalent concentration of 105% typically has an orthophosphoric content of about 49%, pyrophosphoric content of about 42%, triphosphoric content of about 8%, tetraphosphoric content of about 1%. Polyphosphoric acid having $H_3PO_4$ equivalent concentration of 115% contains typically about 5% orthophosphoric content, about 16% pyrophosphoric, about 17% triphosphoric, about 16% tetraphosphoric and 46% higher acids. Polyphosphoric acid having $H_3PO_4$ equivalent concentration of 117% contains typically about 2% orthophosphoric content, about 7% pyrophosphoric, about 8% triphosphoric, about 11% tetraphosphoric and 72% higher acids, as known in the art (see, e.g., FMC Technical Data Sheet, CAS No. 8017-16-1).

Super- and poly-phosphoric acids provide an advantage over phosphoric acid (i.e., acid having $H_3PO_4$ equivalent of less than 100%) in that the super- and poly-phosphoric acids are not water-based and range from very low to no corrosivity while phosphoric acid is water-based and highly corrosive. $H_3PO_4$ contains water that can cause a violent reaction when contacted with hot asphalt under typical blending conditions (120–200° C.). High water evaporation rates can result in foaming and splattering, which was not recognized in the art. Applicants have discovered that superphosphoric and polyphosphoric acids, by contrast, readily can be incorporated into hot polymer modified asphalt, while minimizing foaming or undesirable byproducts.

Storage stability means that the polymer and asphalt phases do not segregate on standing for a specified period of time, usually 2–3 days, at a specified elevated temperature, usually 160° C. Phase separation of the asphalt and the polymer, to the extent that it occurs, should not result in substantial physical segregation of the asphalt and polymer in the blend. That is, for true storage stability the top portion of the blend will have the same continuous phase as the bottom portion. The same phase is continuous if the temperature which corresponds to 1.0 kPa binder stiffness from top and bottom sections is within 2° C. which is equivalent to the variability of the AASHTO TP5 test.

In the phosphonated polymer-modified asphalt blends of the present invention, it is required that the asphalt and polymer remain interspersed throughout the blend during hot storage. This can be measured by physical properties such as dynamic shear stiffness ($G*/\sin \delta$) of samples taken from the top third and bottom third section of a storage stability test tube containing the blend which was kept under static storage conditions at 160±5° C. for 48 hours. Generally, in a system or blend that is phase segregated, the system tends to form layers, such that the phase into which the polymer segregates shows a significantly lower dynamic shear stiffness than that of the asphalt phase, which is substantially depleted of polymer. The storage stable phosphonated asphalt-polymer blends of the present invention will not phase segregate. Rather, the asphalt, polymer and poly- or super-phosphoric acid are present in amounts that are effective to allow the formation of one continuous phase or two interspersed phases that do not segregate on standing at elevated temperatures.

By way of summary, in the present invention a major amount of an asphalt is blended with a minor amount, preferably 0.5 to 7 wt %, more preferably 0.5 to 3% by weight of a suitable polymer or copolymer of at least one diene monomer or at least one unsaturated bond, at a sufficiently elevated temperature and with sufficient blending conditions to thoroughly disperse the polymer in the asphalt; treating the asphalt-polymer blend using 0.05 to 2 wt %, preferably not more than 0.7 wt % of a polyphosphoric or superphosphoric acid per 100 g of asphalt-polymer blend.

The modified asphalt product produced as disclosed herein is a storage stable binder with increased high temperature stiffness, with low temperature stiffness equivalent to the starting asphalt. Typically the product also shows less than 0.1% inorganic residue insoluble in trichloroethylene and having essentially no volatile byproducts.

The enhanced viscoelastic properties are observed as an increase in the dynamic shear stiffness at elevated temperature (which is a measure of rutting resistance) while maintaining the low temperature stiffness (which is a measure of thermal cracking resistance) equivalent to the base (i.e., unmodified) asphalt. The key characteristic of high temperature performance is the maximum temperature at which shear stiffness modulus ($G*$) divided by the sine of phase angle ($\sin \delta$) is at least 1.0 kPa measured on unaged binder or at least 2.2 kPa measured on a Rolling Thin Film residue (aged binder) by a Dynamic Shear Rheometer (AASHTO TP5-93), whichever is lower. This temperature is herein referred to as Maximum Performance Grade Temperature (Max PG Temp) and is one (of two) critical temperatures used to define the Performance Grade (PG) of a binder. Two key characteristics of low temperature performance are: (a) the limiting stiffness temperature (LST), or the temperature at which the creep stiffness is 300 MPa at 60 seconds loading time and (b) the limiting m-value temperature (LmT), or the temperature at which the slope of the Log of creep stiffness against Log of time, is 0.300 at 60 seconds loading, as measured by a Bending Beam Rheometer (AASHTO TP 1). Temperature at which both conditions are satisfied is herein referred to as Minimum Performance Grade Temperature (Min PG Temp) and is the second of the two temperatures used to define the performance grade (PG) of a binder (AASHTO MP1-93). Typically, a pavement binder can be used in pavements at temperatures as low as 10° C. below the limiting stiffness temperature (or limiting m-value temperature) without cracking due to thermal contraction.

The achievement of a storage stable polymer modified asphalt product having the viscoelastic properties described herein with addition of minor amount of super- or polyphosphoric acid is unexpected. Asphalt is a complex mixture of hydrocarbons, most of which are aromatic, and some of which contain unsaturated bonds, basic substituents, and/or other reactive functionalities. The organic bases in asphalt typically are aminic and contain typically 30% to 40% of the total nitrogen in the asphalt. Polymers used herein contain at least one double bond (unsaturated site) or diene monomer. The expected reaction of inorganic acids such as simple o-phosphoric acid would be to first neutralize amines naturally occurring in asphalts, forming ammonium phosphates, then to phosphonate olefinic bonds in the polymer, and finally to phosphonate aromatic rings found in asphalt. It would be expected that the ammonium phosphates would have no effect on storage stability. Additional linkages between phosphonated polymer and phosphonated asphalt moieties would not be expected.

Applicants have discovered, unexpectedly, that super- or poly-phosphoric acid provide additional linkages. While not wishing to be bound by a particular theory Applicants believe that the super- and poly-phosphoric acids act as crosslinking agent with terminal, acidic sites reacting with amines naturally occurring in asphalts, forming ammonium phosphates, while randomly linking its unsaturated P=O sites with olefinic bonds found in the polymer, and aromatic rings found in asphalt by addition reaction without forming undesirable by-products. Consequently, while not wishing to be bound by a particular theory, applicants believe that the product contains an asphalt-polymer-asphalt network in which a long P=O chain in super- or poly-phosphoric acid provides the linkage.

The resulting storage stable binder is essentially free of byproducts and has the required viscoelastic properties described herein.

Typically, the starting asphalt will have a nominal atmospheric boiling point of at least 350° C. and more typically above 440° C. The asphalts should have a penetration grade of from about 50 to 600 dmm at 25° C., preferably 100 to 400, most preferably 300 to 400 dmm as measured by ASTM Standard Test Procedure D5 at 25° C., using 100 g load for 5 seconds. The asphalts used in the present invention may be obtained from a variety of sources of vacuum residue having the flash point at least 230° C. as measured by AASHTO T48 Standard Test procedure and may be classified by their penetration grade according to ASTM Standard Specification D-946 or by viscosity grade according to ASTM Standard Specification D-3381 or by Performance Grade (PG) according to AASHTO MP 1-93.

The polymer used in the blend must contain a diene monomer or unsaturated site. Typically these include block copolymers of styrene and butadiene (SB or SBS); random copolymers of styrene and butadiene (styrene-butadiene rubber or SBR); copolymers of ethylene, propylene, and at least one diene monomer (EPDM); butyl rubbers; or any other suitable polymer having at least one unsaturated bond; or plastomers such as ethylene vinyl acetate (EVA); ethylene metacrylate (EMA); ethylene butyl acrylate (EBA); polyethylene (PE); ethylene glycidyl metacrylate (EGMA); and the mixtures thereof. The weight percent of polymer in the total polymer modified asphalt binder should be an effective amount based on the desired physical properties of the resulting road paving asphaltic binder composition and may be any suitable amount greater than zero typically 0.5 to 7 wt % depending on the polymer desired characteristics and economics sufficient to achieve the foregoing physical properties. For styrene-butadiene block copolymers, this can range from greater to about 7 wt %, preferably 0.5–3 wt %. For ethylene glycidyl metacrylate from 0.5 to about 2 wt %, preferably from about 1–2 wt %. For ethylene vinyl acetate copolymers, from 0.5 to about 6 wt %, preferably from about 0.5–3 wt %. The upper limit is often constrained by the cost of the polymer added, as well as by physical properties of the product. For asphaltic binder compositions used in paving application, too high of a polymer content could lead to excessive viscosity at the operating temperatures making binder difficult to work with.

The major amount of asphalt and minor amount of polymer are blended prior to addition of super- or poly-phosphoric acid at elevated temperature, typically 160° C. to 200° C., with a suitable blending facility which can distribute the polymer uniformly throughout the blend. It is further preferable to maintain the elevated temperature for at least 30 minutes to as much as 24 hours depending on the type, grade and form of the polymer, with constant agitation to achieve phase equilibrium between the dispersed polymer phase and the continuous asphalt phase, before beginning the addition of super- or poly-phosphoric acid.

In the present invention, the asphalt-polymer blend is phosponated with super- or poly-phosphoric acid. Addition of super- or polyphosphoric acid may be performed by means known to one skilled in the art.

Phosphonation of asphalt-polymer mixture can be carried out at the temperatures of sufficient fluidity which may be as low as 120° C., but more typically 160–200° C. However, the actual reaction temperature will depend on the polymer type, grade and content which define the asphalt-polymer basestock viscosity and hence, fluidity, and can be determined by one skilled in the art.

It is possible to adjust the physical properties such as dynamic shear stiffness of the road paving asphaltic composition by varying the amount of super- or poly-phosphoric acid added to the asphalt-polymer blend and/or amount of polymer in the composition. In general, both polymer addition and phosphonation increase the high temperature stiffness of the blend. However, while increase in polymer content generally negatively affects low temperature performance, addition of poly- or super-phosphoric acid has little or no effect on low temperature properties. The low temperature properties are defined primarily by selection of the appropriate grade of starting asphalt while keeping polymer content to a required minimum. The high temperature properties are typically defined by the type and level of phosphonation agent required for a given asphalt-polymer combination. The physical properties of the resulting composition will vary accordingly. In addition, if necessary, in order to bring the shear stiffness of the mixture into the range acceptable for the particular application, additional untreated asphalt may be added as a flux to the phosphonated asphaltic composition. The amount of flux to be added will depend on the stiffness of the starting materials and the desired stiffness of the end product and the particular application and is readily determinable by one skilled in the art in view of the teachings herein.

Another embodiment of the present invention is novel asphaltic paving compositions which include the asphaltic binder compositions produced as described above.

The storage stable binder compositions having the aforementioned features and made by the methods disclosed herein are also included in the invention.

It has been found that, as compared with asphalt alone and non-phosphonated polymer-modified asphalts, the crosslinked, phosphonated polymer-asphalt binders herein have superior viscoelastic properties, dynamic creep stiffness, phase compatibility and, thus, storage stability. Desirably the resulting phosphonated polymer modified asphalt will reach a maximum performance grade temperature of at least 64° C. to above 80° C. while maintaining the minimum performance grade temperature of the base asphalt. With storage stability, asphalt and polymer phases are substantially uniformly dispersed in each other and do not phase separate on standing for long periods at elevated temperatures. Thus, the asphalt and polymer phases present in the composition are effectively distributed in a uniform or substantially uniform manner as evidenced by optical microscopy. Substantially uniform means a distribution that effectively maintains asphalt and polymer phases without significant segregation and results in phase stability. A disadvantage of blends that are not storage stable at elevated temperatures is that the polymer and asphalt phase segregate and become unusable, particularly after standing at elevated temperatures.

The binders may be combined as known in the art with aggregate or rock to form paving compositions having enhanced properties. To form the paving compositions, the novel binders may be combined with aggregate or rock in effective amounts by any suitable means known to one skilled in the art. Aggregate is known to those skilled in the art and suitably is any particulate material used in road paving applications for combination with binder. Any suitable material, typically, locally available materials may be used, e.g., rock, stone granite, shells or other suitable high modulus material. The novel binder compositions of the present invention may be used to form paving compositions containing aggregate or rock and the novel binders disclosed herein by forming the binder according to the methods disclosed above, and mixing the binder with aggregate or rock to form the road paving composition, which paving material may be applied to a paving surface according to methods and under conditions known to those skilled in the art to be effective to produce a road paving surface.

Inorganic trichloroethylene-insoluble additives are sometimes added to asphaltic pavement binders, in which case there may be more than the typical level of less than 0.1% resulting from the practice of this invention, but such additives are optional for the practice of this invention.

The invention is demonstrated with reference to the following examples:

EXAMPLE 1

A sample of 3082 g of 325 dmm penetration asphalt (Superpave™ Grade: PG 46-34), supplied by Exxon Company USA, Billings Refinery, was charged to a 4 liter laboratory reaction vessel equipped with a 6 bladed vertical shaft turbine mixer. The asphalt was heated to 195° C. The polymer, a radial triblock SBS (Vector 2411 PD supplied by Dexco), was added gradually (95.3 g, i.e., 3 wt %, based on asphalt-polymer blend weight) at 195° C. with stirring at 1000 rpm. The mixture was blended for 24 hours to produce an asphalt-polymer blendstock with uniform polymer in asphalt distribution. After 24 hours, the blendstock was analyzed according to AASHTO PP6-93, Practice for Grading or Verifying the Grade of an Asphalt Binder and the results are summarized in Table 1. This asphalt-polymer blendstock was used for further treatment (phosphonation) with superphosphoric (SP105) or polyphosphoric acid (PP115). In run #69 a portion of the asphalt-polymer blendstock (334.2 g) was charged to a 0.5 L laboratory blender equipped with a 6 blade vertical shaft mixer. The blendstock was heated to 160° C. and 1.685 g of SP 105 was added gradually to a final content of 0.50 wt % of SP 105 based on total weight of the product. Mixing was allowed to continue for additional 30 minutes to ensure uniform distribution of SP105 and after 30 minutes the product was analyzed according to AASHTO PP6-93. In run #70 a second portion (328.9 g) of the same asphalt-polymer blendstock was charged to 0.5 L laboratory blender. The blendstock was heated to 160° C. and 1.6795 g of PP 115 was added gradually to a final content of 0.51 wt % of PP115 based on total weight of the product. Mixing was allowed to continue for additional 30 minutes to ensure uniform distribution of PP115 throughout the product and after 30 minutes product was analyzed according to AASHTO PP6-93 protocol. In run #71 a third portion (316.4 g) of the same asphalt-polymer blendstock was charged to 0.5 L laboratory blender. The blendstock was heated to 160° C. and 0.9478 g of SP 105 was added gradually to a final content of 0.30 wt % of SP105 based on total weight of the product. Mixing was allowed to continue for additional 30 minutes to ensure uniform distribution of SP 105 and after 30 minutes product was analyzed according to AASHTO PP6-93 protocol. In run #72 a forth portion (341.9 g) of the same asphalt-polymer blendstock was charged to 0.5 L laboratory blender. The blendstock was heated to 160° C. and 1.1177 g of PP 115 was added gradually to a final content of 0.326 wt % of PP115 based on total weight of the product. Mixing was allowed to continue for 30 minutes to ensure uniform distribution of PP115 and after 30 minutes product was analyzed according to AASHTO PP6-93 protocol. Results are summarized in Table 2, runs #69 to #72.

TABLE 1

Preparation of asphalt + 3 wt % SBS blendstock

|  | Run ID | |
| --- | --- | --- |
| Composition | 97-01 | 66 |
| Asphalt (325 dmm, penetration 25° C.), wt % | 100 | 97.0 |
| SBS (V2411PD, radial), wt % | 0 | 3.0 |
| Superpave ™ Performance | | |
| Maximum PG Temperature, ° C. (1) | 48.6 | 60.0 |
| Minimum PG Temperature, ° C. (2) | −37.5 | −36.1 |
| Performance Grade (PG) (3) | 46–34 | 58–34 |
| PG Temperature Range, ° C. (4) | 86.1 | 96.1 |
| Storage Stability (5) | N/A | No |

The following terms and abbreviations apply to Table 1 and all subsequent Tables.
(1) Maximum PG Temperature is the temperature where dynamic shear stiffness (AASHTO TP5-93), $G^*/\sin \delta$ equals 1.0 kPa at 10 rad/s loading time (measured on the original binder, i.e., binder that has not been aged prior to testing) or $G^*/\sin \delta$ equals 2.2 kPa at 10 rad/s (measured on rolling thin film residue i.e. binder that has been aged prior to testing according to AASHTO T240 protocol), whichever is lower.
(2) Minimum PG Temperature is the temperature (minus 10° C.) where both conditions: maximum creep stiffness of 300 MPa and minimum m-value of 0.300 at 60 s loading time, are satisfied.
(3) Performance Grade (PG) refers to Superpave™ grading system as defined in AASHTO MP1-93. Grades are designated in increments of 6° C. as PG XX-YY where XX stands for Average 7-day Maximum Pavement Temperature and YY for 1-day Minimum Pavement Temperature.
(4) PG Temperature Range is the range between Maximum PG Temperature and Minimum PG Temperature and represents the temperature domain within which a binder will perform without showing signs of distress such as rutting or thermal cracking.
(5) Storage Stability is determined by dynamic shear measurements (AASHTO TP5) of the top and bottom specimen from a binder which has been maintained under static storage conditions at 160° C. for at least 48 hours. Product is storage stable if the temperature which corresponds to 1.0 kPa binder shear stiffness measured at 10 rad/s, from top and bottom sections of storage stability tube is within 2° C. (equivalent to estimated variability of AASHTO TP5 test).

TABLE 2

Phosphonated binders prepared using [Asphalt + 3 wt % SBS] blendstock

|  | Run ID Example 1 | | | | |
| --- | --- | --- | --- | --- | --- |
| Composition | 66 | 69 | 70 | 71 | 72 |
| Asphalt + 3 wt % SBS, wt % | 100 | 99.50 | 99.49 | 99.70 | 99.67 |
| Superphosphoric acid (SP105), wt % | | 0.50 | | 0.30 | |
| Polyphosphoric acid (PP115), wt % | | | 0.51 | | 0.33 |
| Superpave ™ Performance | | | | | |
| Maximum PG Temperature, ° C. | 60.0 | 69.9 | 72.7 | 66.2 | 68.2 |
| Minimum PG Temperature, ° C. | −36.1 | −35.7 | −35.7 | −36.3 | −35.9 |
| Performance Grade (PG) | 58–34 | 64–34 | 70–34 | 64–34 | 64–34 |
| PG Temperature Range, ° C. | 96.1 | 105.6 | 108.4 | 102.5 | 104.1 |
| Storage Stability | No | Yes | Yes | Yes | Yes |

With the present invention it is possible to adjust the physical properties such as dynamic shear stiffness of the road paving binder composition, to enhance the high temperature performance by varying the amount and/or the type of phosphonation agent added to the asphalt-polymer blend. The composition of present invention enhanced the high temperature performance (Maximum PG Temperature) of the polymer-asphalt binder from 60.0° C. to between 66.2 and 72.7, depending on the type and concentration of the phosphonating agent, also, the practice enhanced storage stability, while the low temperature performance (Minimum PG Temperature) was maintained at around minus 36±0.3° C.

EXAMPLE 2

A sample of 298.5 g of 174 dmm penetration asphalt (Superpave™ Grade: PG 52-28), supplied by Exxon Company USA, Billings Refinery, was charged to a 0.5 liter laboratory blender equipped with a 6 bladed vertical shaft mixer. The asphalt was heated to 170° C. Ethylene vinyl acetate (EVA) polymer (AT1240A grade, having Melt Index of 10 and vinyl acetate content of 12%, supplied by AT Plastics), was added gradually (10.64 g, i.e., 3.4 wt % based on asphalt-polymer blend weight) at 170° C. with stirring at approximately 800 rpm. The mixture was blended for 2 hours to produce an asphalt-polymer blend with uniform polymer in asphalt distribution. The blend was analyzed according to AASHTO PP6-93, Practice for Grading or Verifying the Grade of an Asphalt Binder and the results are summarized in Table 3 under run #106. For comparison, another asphalt-EVA polymer blend containing 3.0 wt % of the same polymer was blended under the same conditions and the blend was treated with 0.5 wt % (based on total weight of the final product) of superphosphoric acid (SP105) in the last hour of asphalt-polymer blending. Mixing was allowed to continue to up to 2 hours total blending time. The product was analyzed according to AASHTO PP6-93 protocol and the results are summarized in Table 3 under run #107. This example demonstrates that lower EVA content (3.0 wt %) with only 0.5 wt % SP105 produces binder with performance properties up to 2 grades (PG 76-28) above the binder containing 3.4 wt % EVA alone (PG 64-22) prepared using the same base asphalt (A257), under the same blending conditions and 4 grades higher then base asphalt (A257) alone. In addition, when EVA alone was used (run #106), Minimum PG Temperature increased from minus 31.8° C. (for base asphalt) to minus 27.9° C. (for #106) which affected the low temperature PG grading designation, as well. In summary, based on Superpave™ performance properties of composition #107 (Table 3) this binder was classified as PG 76-28, which was two grades better in the high temperature domain and one grade better in the low temperature domain compared to asphalt-EVA blend #106 (graded as PG 64-22).

EXAMPLE 3

A sample of 324.6 g of 157 dmm penetration asphalt (Superpave™ Grade: PG 52-28), supplied by Exxon Company USA, Billings Refinery, was charged to a 0.5 liter laboratory blender equipped with a 6 bladed vertical shaft turbine mixer. The asphalt was heated to 180° C. Glycidyl metacrylate (GMA) polymer, supplied by DuPont under a trade name Elvaloy® AM was added gradually (6.62 g; 2.0 wt % based on asphalt-polymer blend weight) at 180° C. with stirring at approximately 800 rpm. The mixture was blended for 1 hour to produce an asphalt-polymer blend with uniform polymer in asphalt distribution. After 1 hour, 0.5 wt % (based on total weight of the product) of superphosphoric acid (SP105) was gradually added to the asphalt-GMA mixture and blending was allowed to continue for additional 60 minutes. Product was analyzed according to AASHTO PP6-93 protocol and the results are summarized in Table 3 under run #110. For comparison, another sample (run #109) of the same asphalt-GMA polymer blend was prepared under the same blending conditions and the blend was treated with 1.0 wt % (based on total weight of the product) of superphosphoric acid (SP105). Product was analyzed according to AASHTO PP6-93 protocol and the results are summarized in Table 3 under run #109.

Example 3 demonstrated that at a constant GMA polymer content (2 wt %), the temperature range enhancement was higher for composition containing higher superphosphoric acid content, i.e., the binder application temperature range was increased from 88.6° C. (base asphalt, A124) to 101.9° C. (for composition containing 0.5 wt % SP105, run #110) and up to 115° C (for composition containing 1.0 wt % of SP105 (based on the weight of total product), run # 109). This temperature range enhancement after treatment with superphosphoric acid resulted in 3 to 5 PG grades higher binder classification in comparison to base asphalt making these binders suitable for use in the regions having wide variation in climatic conditions (high pavement temperature, up to 82° C. in summer, down to minus 28° C. in winter) or where heavy traffic load is expected. In summary, Table 3, composition #110 was graded as PG 70-28, and composition #109, graded as PG 82-28, producing binders that were three to five PG grades better in the high temperature domain, compared to the base asphalt (A124) having performance properties of PG 52-28. Both compositions had low temperature performance comparable to the base asphalt.

TABLE 3

Phosphonated binders prepared using asphalt-polymer blendstocks
(where polymer = ethylene vinyl acetate or glycidyl metacrylate)

| | | Run ID | | | | |
|---|---|---|---|---|---|---|
| | | Example 2 | | | Example 3 | |
| Composition | A257 | 106 | 107 | A124 | 110 | 109 |
| Base Asphalt | | | | | | |
| PG 52-28 (Pen 25° C., 174 dmm), wt % | 100 | 96.6 | 97.0 | | | |
| PG 52-28 (Pen 25° C., 157 dmm), wt % | | | | 100 | 98.0 | 98.0 |
| Polymer | | | | | | |
| EVA (AT Plastics), wt % | | 3.4 | 3.0 | | | |
| GMA (DuPont), wt % | | | | | 2.0 | 2.0 |
| Product Composition | | | | | | |
| Base asphalt + polymer, wt % | | 100 | 99.5 | | 99.5 | 99.0 |
| Superphosphoric acid (SP105), wt % | | | 0.5 | | 0.5 | 1.0 |
| Superpave ™ Performance | | | | | | |
| Maximum PG Temperature, ° C. | 55.7 | 65.9 | 77.4 | 56.1 | 70.4 | 83 |
| Minimum PG Temperature, ° C. | −31.8 | −27.9 | −29.6 | −32.5 | −31.5 | −32 |
| Performance Grade (PG) | 52–28 | 64–22 | 76–28 | 52–28 | 70–28 | 82–28 |
| PG Temperature Range, ° C. | 87.5 | 93.8 | 107 | 88.6 | 101.9 | 115 |
| Storage Stability | N/A | No | Yes | N/A | Yes | Yes |

For storage stability determination, a copper tube (3 cm diameter, 24 cm long) was filled with finished product and stored at 160° C. for 5 days. The tube was then taken out of the oven and allowed to cool to room temperature and then cut into three sections. The middle section was discarded and the top and bottom sections were tested using a dynamic shear rheometer at 10 rad/s shear rate. When the temperature where dynamic shear stiffness (G*/sin δ) equals 1.0 kPa (Max PG Temp) of the top and bottom of the sample was within 2° C., the product was considered storage stable.

EXAMPLE 4 (COMPARATIVE)

Two asphalt compositions, one of which containing super-phosphoric acid (SP105) and both meeting Superpave performance grade PG 64-34 requirements, where prepared. The first composition (run #50) was prepared in the following fashion: a sample of 2621 g of 325 dmm penetration asphalt (Superpave Grade: PG 46-34), supplied by Exxon Company USA, Billings Refinery, was charged to a 4 liter laboratory reaction vessel equipped with a 6 bladed vertical shaft turbine mixer. The asphalt was heated to 205° C. The polymer, a radial triblock SBS (Vector 2411 PD supplied by Dexco) was added gradually (123.5 g, i.e., 4.5 wt %, based on total blend weight) at 205° C. with stirring at 1000 rpm. The mixture was blended for 22 hours to produce an asphalt-polymer blend with uniform polymer in asphalt distribution. After 22 hours, the blend was analyzed according to AASHTO PP6-93, Practice for Grading or Verifying the Grade of an Asphalt Binder and the results are summarized in Table 4 under run #50. This binder met PG 64-34 requirements. In run #69 a sample of the asphalt-polymer blendstock (334.2 g) containing 3 wt % SBS polymer (Vector 2411 PD, radial) was charged to a 0.5 L laboratory blender equipped with a 4 blade vertical shaft mixer. The blendstock was heated to 160° C. and 1.65 g of SP 105 was added gradually to a final content of 0.50 wt % of SP105 based on total weight of the product. Mixing was allowed to continue for additional 30 minutes to ensure uniform distribution of SP105 and after 30 minutes the product was analyzed according to AASHTO PP6-93 Practice for Grading or Verifying the Grade of an Asphalt Binder and the results are summarized in Table 4 under run #69. This binder met PG 64-34 requirements.

Two other asphalt compositions, one of which containing poly-phosphoric acid (PP115) and both meeting Superpave performance grade PG 70-28 requirements, were prepared. A sample of 2110 g (run #105) of 171 dmm penetration asphalt (Superpave Grade: PG 52-28), supplied by Exxon Company USA, Billings Refinery, was charged to a 4 liter laboratory reaction vessel equipped with a 6 bladed vertical shaft turbine mixer. The asphalt was heated to 195° C. The polymer, a radial triblock SBS (Vector 2411 PD supplied by Dexco) was added gradually (43.1 g, i.e., 2.0 wt %, based on total blend weight) at 195° C. with stirring at 1000 rpm. The mixture was blended for 23 hours to produce an asphalt-polymer blendstock with uniform polymer in asphalt distribution. The blend was further treated with 0.5 wt % (based on total weight of the product) of superphosphoric acid (SP105). Product was analyzed according to AASHTO PP6-93 protocol and the results are summarized in Table 4 under run #105. This binder met PG 70-28 requirements. Sample #RO31, was a refinery production sample made from a similar base asphalt (Superpave Grade: PG 52-28) and containing 4.5% SBS radial polymer.

TABLE 4

| | Example 4 Run OD | | | |
|---|---|---|---|---|
| Composition | 69 | 50 | 105 | RO31 |
| Base Asphalt | | | | |
| PG 46-34, wt % | 97.0 | 95.5 | | |
| PG 52-28, wt % | | | 98 | 95.5 |
| Polymer | | | | |
| SBS (V 2411, radial triblock), wt % | 3.0 | 4.5 | 2.0 | 4.5 |
| Product Composition | | | | |
| Base asphalt + polymer, wt % | 99.5 | 100 | 99.5 | 100 |
| Superphosphoric acid (SP105), wt % | | | 0.5 | |
| Polyphosphoric acid (PP115), wt % | 0.5 | | | |
| Superpave ™ Performance | | | | |
| Maximum PG Temperature | 69.9 | 64.3 | 72.4 | 72.3 |
| Minimum PG Temperature | −35.7 | −34.5 | −30.8 | −29.5 |
| Performance Grade (PG) | 64–34 | 64–34 | 70–28 | 70–28 |

One benefit of the present invention is that the modified asphalts produced according to the invention require less (typically 30–70% less) added polymer than is currently required to produce a given, high performance grade, asphalt binder. Table 4 illustrates this point; in case of PG 64-34 grades (run #69 and run #50) about 34 wt % less polymer was required in the composition of present invention (run #69) to achieve the same PG grade as #50. The Maximum PG Temperature of 69.9° C. in the composition of run #69 is very close to 70° C. making this binder nearly a PG 70-34 grade while having only 3 wt % SBS polymer, while run #50 shows that Max PG Temp of 64.3° C. is very close to 64° C. making this binder a borderline PG 64-34 grade having as high as 4.5 wt % SBS polymer content. In case of PG 70-28 grades (run #105 and run #RO31) about 55 wt % less polymer was required in the composition of present invention (run #105) to achieve the same PG grade as #RO31 with similar Superpave™ properties.

EXAMPLE 5 (COMPARATIVE)

A blend was prepared in which that $H_3PO_4$ (85%) was added to polymer modified asphalt containing 4.5 wt % EVA in 132 dmm at 25° C. penetration asphalt. Fifty percent higher acid loading was required to produce a polymer modified asphalt having performance properties similar to the comparable polymer modified asphalt using PP 115 polyphosphoric acid. However, the addition also produced a violent reaction accompanied by foaming and was difficult to control.

What is claimed is:

1. A polymer modified asphalt binder composition, consisting of:
    a blend of a major amount of an asphalt having a flash point of at least 230° C. with a minor amount of a polymer having at least one diene monomer or unsaturated bond; and
    0.05–2 wt. % of polyphosphoric acid having an $H_3PO_4$ equivalent of at least 100% by weight of asphalt-polymer blend.

2. The composition of claim 1 wherein the polymer is selected from the group consisting of random and block copolymers of styrene and butadiene, butyl rubber, ethylene propylene diene polymer, ethylene vinyl acetate (EVA) polymer, ethylene methacrylate (EMA) polymer, ethylene glycidyl methacrylate (EGMA) polymer, ethylene butyl acrylate (EBA) polymer, polyethylene, and mixtures thereof.

3. The composition of claim 1 and wherein the acid is selected from polyphosphoric and superphosphoric acids.

4. The composition of claim 1 wherein the polymer is admixed in the range of from 0.5–7 wt % polymer to total composition.

5. The composition of claim 1 wherein the polymer is admixed in an amount of 0.5 to 3 wt % polymer to total composition.

6. The composition of claim 1 wherein the acid is admixed in an amount of 0.05–2 wt % based on the weight of the total composition.

7. The composition of claim 1 wherein the acid is admixed in an amount of 0.05–0.7 wt % based on the weight of the total composition.

8. The composition of claim 1 wherein the starting asphalt has a penetration 25° of 50–600 dmm.

9. The composition of claim 1 wherein the asphalt has a penetration at 25° C. of 300–400 dmm, the polymer is from 1–3 wt % styrene-butadiene-styrene radial triblock and the polyphosphoric acid has a $H_3PO_4$ equivalent concentration of 115% by weight of asphalt-polymer blend.

10. The composition of claim 1 wherein the starting asphalt has a penetration at 25° C. of 100–400 dmm.

11. The composition of claim 1 wherein the starting asphalt has a penetration at 25° C. of 300–400 dmm and phosphoric acid has $H_3PO_4$ equivalent of at least 105%.

12. A method of making a road paving binder composition, consisting of:
  (a) blending a minor amount of a polymer having at least one diene monomer or one unsaturated bond with a major amount of asphalt having a flash point of at least 230° C. at an elevated temperature sufficient to permit blending; and
  (b) treating the asphalt-polymer blend with 0.05–2 wt. % of a phosphonating agent having an $H_3PO_4$ equivalent of at least 100%.

13. The method of claim 12 wherein the polymer is selected from the group consisting of radial and block copolymers of styrene and butadiene, butyl rubber, ethylene methacrylate polymer, ethylene propylene diene polymer, ethylene vinyl acetate polymer, ethylene butylacrylate polymer, ethylene glycidyl methacrylate polymer, polyethylene and mixtures thereof.

14. The method of claim 12 wherein of step (b) is carried out at a temperature of from 120° C. to 200° C.

15. The process of claim 12 wherein the acid is selected from superphosphoric and polyphosphoric acids.

16. A road paving asphalt composition, consisting of:
  a major amount of aggregate; and
  the balance by weight of a polymer modified asphalt binder containing a polymer selected from the group consisting of butyl rubber, radial and block copolymers of styrene and butadiene, ethylene methacrylate polymer, ethylene propylene diene polymer, ethylene vinyl acetate polymer, ethylene butylacrylate polymer, glycidyl methacrylate polymer, polyethylene, and mixtures thereof in admixture with polyphosphoric acid having an $H_3PO_4$ equivalent of at least 105% in an amount sufficient to maintain low temperature performance of the base asphalt and to obtain maximum performance grade temperature of at least 64° C. and a base asphalt having a penetration range of from 50–600 dmm at 25° C.

17. A method of making a polymer modified asphalt binder composition, consisting of: contacting a blend of a major amount of an asphalt having a flash point of at least 230° C. and a minor amount of a polymer having at least one diene monomer or unsaturated bond with 0.05–2 wt. % of polyphosphoric acid having an $H_3PO_4$ equivalent of at least 100% by weight of asphalt-polymer blend.

* * * * *